United States Patent
Lipo et al.

(10) Patent No.: US 6,570,778 B2
(45) Date of Patent: May 27, 2003

(54) ADJUSTABLE SPEED DRIVE FOR SINGLE-PHASE INDUCTION MOTORS

(75) Inventors: Thomas A. Lipo, Middleton, WI (US); Miroslav Chomat, Prague (CZ)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/943,417

(22) Filed: Aug. 30, 2001

(65) Prior Publication Data

US 2003/0043606 A1 Mar. 6, 2003

(51) Int. Cl.⁷ .............................. H02M 1/12; H02P 7/36

(52) U.S. Cl. .......................................... 363/41; 318/807

(58) Field of Search .............................. 363/41, 34, 39, 363/49; 318/708, 738, 700, 751, 259, 441, 442, 230, 807, 231

(56) References Cited

U.S. PATENT DOCUMENTS

| | | | |
|---|---|---|---|
| 4,047,083 A | * 9/1977 | Plunkett | 318/231 |
| 4,060,754 A | 11/1977 | Kirtley, Jr. et al. | |
| 4,401,933 A | 8/1983 | Davy et al. | |
| 5,136,216 A | * 8/1992 | Wills et al. | 323/220 |
| 5,252,905 A | * 10/1993 | Wills et al. | 318/708 |
| 5,272,616 A | 12/1993 | Divan et al. | |
| 5,402,053 A | * 3/1995 | Divan et al. | 363/49 |
| 5,566,219 A | * 10/1996 | Volger | 318/442 |
| 5,796,234 A | * 8/1998 | Vrionis | 318/751 |
| 5,969,957 A | 10/1999 | Divan et al. | |
| 6,051,952 A | * 4/2000 | Moreira et al. | 318/738 |

FOREIGN PATENT DOCUMENTS

GB 2111326 6/1983

OTHER PUBLICATIONS

P. Enjeti, et al., "Economic Single Phase to Three Phase Converter Topologies for Fixed Frequency Output," IEEE APEC Conf. Rec. 1991, pp. 88–94. No Date.

Chingchi Chen, et al., "Simple Topologies for Single Phase AC Line Conditioning," Conf. Rec. IEEE–IAS Annual Meeting, Oct., 1991, pp. 911–917.

Chingchi Chen, et al., "A Single Phase to Three Phase Power Converter for Motor Drive Applications," Conf. Rec., IEEE IAS, 1992, pp. 639–646. No Date.

P. Enjeti, et al., "A Low Cost Single Phase to Three Phase Static Power Converter," IEEE Rural Electronics Conference, May, 1992.

David K. Morgan, "COS/MOS Phase–Locked–Loop . . . A Versatile Building Block for Micro–Power Digital and Analog Applications," Texas Instruments Application Report, published prior to 2001. No Date.

Edward Randolph Collins, "Torque and Slip Behavior of Single–Phase Induction Motors Driven from Variable–Frequency Supplies," IEEE Trans. on Industry Applications, vol. 28, No. 3, May/Jun., 1992, pp. 710–715.

(List continued on next page.)

Primary Examiner—Rajnikant B. Patel
(74) Attorney, Agent, or Firm—Foley & Lardner

(57) ABSTRACT

An adjustable speed drive for single-phase induction motors has a low-cost structure including a rectifier and a two-switch inverter. During full-speed operation, power is supplied directly from the AC power system to the main winding of the motor and from the inverter at line frequency but phase-shifted from the line voltage to an auxiliary winding of the motor to develop start up torque for the motor. In one or more lower speed operating modes, power is supplied from the inverter at a lower frequency directly to the main winding and through a phase-shifting capacitor to the auxiliary winding of the motor. Low cost switching devices may be used in the inverter since they are not required to switch the full-speed power of the motor.

20 Claims, 10 Drawing Sheets

OTHER PUBLICATIONS

Alexander L. Julian, et al., "Multi–Speed Control of Single–Phase Induction Motors for Blower Applications," IEEE Trans. on Power Electronics, vol. 10, No. 1, Jan., 1995, pp. 72–77.

M.B.R. Correa, et al., "Single–Phase Induction Motor Drives Systems," Conference Records IEEE/APEC, vol. 1, 1999, pp. 403–409. No Date.

Do–Hyun Jang, et al., "Space Vector PWM Technique for Two–Phase Inverter–Fed Single–Phase Induction Motors," Conference Records IEEE/IAS Annual Meeting, 1999, pp. 47–53, No Date.

E.R. Benedict, et al., "Improved PWM Modulation for a Permanent–Split Capacitor Motor," Conference Record IEEE/IAS 2000, pp. 2004–2010. No Date.

* cited by examiner

ADJUSTABLE SPEED DRIVE FOR SINGLE-PHASE INDUCTION MOTORS

REFERENCE TO GOVERNMENT RIGHTS

This invention was made with United States government support awarded by the following agency: NSF 9731677. The United States government has certain rights in this invention.

FIELD OF THE INVENTION

This invention pertains generally to the field of electrical power conversion systems and particularly to power converters for supplying power to single-phase induction motors.

BACKGROUND OF THE INVENTION

Single-phase induction motors typically include a main stator winding which provides the main drive power for the motor and an auxiliary winding which is supplied with power through a capacitor to provide starting torque for the motor. The auxiliary winding may be disconnected when the motor reaches operating speed, as in a capacitor start motor, or it may be supplied with power constantly as in a permanent split capacitor motor. The capacitor connected in series with the auxiliary winding provides the phase shift of the voltage applied to the auxiliary winding that allows starting torque to be developed. Such single-phase induction motors are widely used in residential and commercial applications, such as in home appliances, fans, pumps, etc., and are manufactured in large volumes at relatively low unit cost.

Single-phase induction motors inherently operate at a constant speed determined by the AC power line frequency (50 or 60 Hz) and the load imposed on the motor. For various applications, such as fan drives, it would be desirable to be able to operate the motor at selectable speeds. The operating speed of a fan drive motor can be reduced by simply reducing the AC voltage applied to the motor. While this approach allows the use of inexpensive control circuitry, operating the motor at reduced voltage levels lowers the energy efficiency of the motor and generally does not result in close control of the motor speed. Another approach is the use of a variable frequency converter which receives AC power from the AC power system, rectifies it, and inverts the power to an approximately sinusoidal output voltage at a selected frequency that may be higher or lower than the normal line frequency. While such power conversion systems can provide effective variable speed drive of the motor, the cost of the power converter itself is significant (particularly as compared to the low-cost induction machine it is driving) because of the complexity of the power converter and the need for several (typically at least six) semiconductor switches which must be rated to handle the maximum voltage and current to be supplied to the motor. Consequently, such power converters have not been practical for use in low-cost applications such as single phase fan motor drives.

SUMMARY OF THE INVENTION

In accordance with the present invention, an adjustable speed drive is provided having a simple, low-cost structure that is well suited for use with low-cost single-phase induction motors. The drive is capable of operating in a full-speed mode with high starting torque, and in at least one lower speed mode which is well suited for applications such as fan motor drives. The adjustable speed drive of the invention may also be operated in multiple discrete speed modes or continuously variable speed modes if desired. The adjustable speed drive of the invention supplies power to the motor at higher efficiencies than can be obtained with conventional low-cost drives that reduce the voltage applied to the motor to reduce speed.

The adjustable speed drive of the invention includes a rectifier which receives AC power at first and second AC input lines from the AC power mains and provides DC power across DC bus lines, and a single-phase two switch inverter which provides AC power at an output line at a selected frequency and phase shift with respect to the input power from the main power lines. The output of the inverter is supplied to a transfer switch circuit which is also connected to the second of the input lines to receive AC power from the AC power lines. The transfer switch circuit also is connected to a phase-shifting capacitor and has a main winding supply line connectable to the main winding of the motor and an auxiliary winding supply line connectable to the auxiliary winding of the motor. Both the main and auxiliary windings are connected to the first of the AC input lines to complete the circuits through these windings. For full-speed mode operation, the inverter is operated to provide an output voltage that is at line frequency and approximately 90° out of phase with the line voltage. The transfer switch circuit connects the inverter output to the auxiliary winding and connects the second input line to the main motor winding. Operation in this mode provides relatively high starting torque, superior to that obtainable by the use of a capacitor to provide the phase shift for the voltage applied to the auxiliary winding. After start-up, the inverter may continue to provide power to the auxiliary winding for maximum efficiency. The torque capability of the motor is improved by the fact that a voltage of correct amplitude and 90° phase shift is provided by the inverter, allowing operation over a wider range of loads than is available with a capacitor-run motor. Operation may also be in a mode analogous to the operation of a capacitor start motor, in which the inverter may be disconnected or turned off so that power is supplied only to the main winding through the transfer switch circuit after the motor reaches operating speed as determined by the motor load and line frequency (e.g., 60 Hz). For operation at reduced speed, for example, for fan drives for heating, ventilating and air conditioning systems, the inverter may be operated to provide AC output power at a frequency lower than line frequency (e.g., 30 Hz for approximately half-speed operation), and the transfer switch circuit is operated to supply power from the inverter output directly to the main winding of the motor and through the capacitor to the auxiliary winding of the motor, thereby providing phase-shifted voltage (at the lower frequency) to the auxiliary winding to provide start-up torque. Power may also be provided from the inverter through the capacitor to the auxiliary winding after the motor is up to speed. The inverter may also be operated at additional discrete or continuously variable frequencies to further expand adjustable speed drive control of the induction motor in this mode.

In a preferred adjustable speed drive in accordance with the invention, the rectifier includes a pair of rectifying diodes connected together at a node and connected across DC bus lines. A pair of energy storage capacitors is also connected across the DC bus lines, with a node between the capacitors connected to a first of the input lines, and with the second of the input lines connected to the node between the pair of diodes. The diodes and capacitors serve to rectify AC voltage from the main power system to a DC voltage across the DC bus lines. An inverter comprised of two gate controlled switching devices is connected across the DC bus lines. A first output line is connected to the first input line, a second output line is connected from the second input line to the transfer switch circuit, and a third output line is connected from the node connecting the pair of controlled switching devices to the transfer switch circuit. The first output line is connectable to both the main winding and the auxiliary winding of a motor to be driven. A main winding supply line extends from the transfer switch circuit for connection to the main winding and an auxiliary winding supply line extends from the transfer switch circuit for connection to the auxiliary winding. A phase-shifting capacitor is connected to the transfer switch circuit. The transfer switch circuit can comprise a first switch connected on one side to the second and third output lines and on the other side to the main winding supply line, the first switch switchable between a position connecting the second output line to the main winding supply line and a position connecting the third output line to the main winding supply line. The transfer switch circuit can further comprise a second switch connected on one side directly to the third output line and to the third output line through a phase-shift capacitor and with the auxiliary winding supply line connected on the other side of the second switch. The second switch is switchable between a position connecting the third output line to the auxiliary winding supply line directly and a position connecting the third output line to the auxiliary winding supply line through the phase-shift capacitor. The first and second switches may be switched together and may comprise a relay, in the first position of which the second output line is connected directly to the main winding supply line to supply power directly from the power system to the main winding and the third output line is connected to provide power from the inverter through the auxiliary winding supply line to the auxiliary winding. In a second position of the transfer switch, the third output line is connected directly from the inverter to the main winding supply line to supply power to the main winding and the third output line is connected through the phase-shift capacitor to the auxiliary supply line to supply to the auxiliary winding power that is phase-shifted from the power applied to the main winding.

A controller is connected to the switching devices of the inverter and to the transfer switch circuit to respond to input commands to change the two positions of the transfer switch circuit and to appropriately control the switching of the switching devices in the inverter to generate AC output power at the appropriate frequency and phase shift. The circuit constructed in this manner can be utilized to operate at discrete frequencies and thus discrete motor speeds as well as allowing continuously variable driving of the motor, if desired, utilizing a minimum number of components. The switching devices of the inverter, e.g., semiconductor switches such as IGBTs or MOSFETs, can be devices which have a significantly lower rating, and thus lower cost, than devices which would be required to drive the motor at full speed. When the inverter is utilized to provide power to the auxiliary winding during full-speed mode operation, the current drawn by the auxiliary winding is significantly less than that drawn by the main winding, which is supplied directly from the power lines through the transfer switch. In the lower speed (and lower frequency) mode or modes, the torque-producing currents drawn by the main winding and auxiliary winding are generally significantly less than currents drawn at full speed. For example, the power required to drive a fan increases as a cubic function. Thus, the power required to drive the fan at half-speed is only ⅛ that at full speed, and an inverter designed to operate in a second mode at half-speed may utilize switching devices which are rated for only ⅛ of the full speed motor power.

Although less torque is required due to the typical load characteristics at lower speed and lower excitation frequency, the magnetic flux levels in the motor will increase as excitation frequency decreases if winding voltage remains constant. To avoid saturation, the invention can be adapted to reduce inverter output voltage to maintain a fixed direct proportionality relationship between winding voltage and excitation frequency. This is familiar to those skilled in the art as "constant volts per hertz" control.

Further objects, features and advantages of the invention will be apparent from the following detailed description when taken in conjunction with the accompanying drawings.

DETAILED DESCRIPTION OF THE INVENTION

Figure 1:
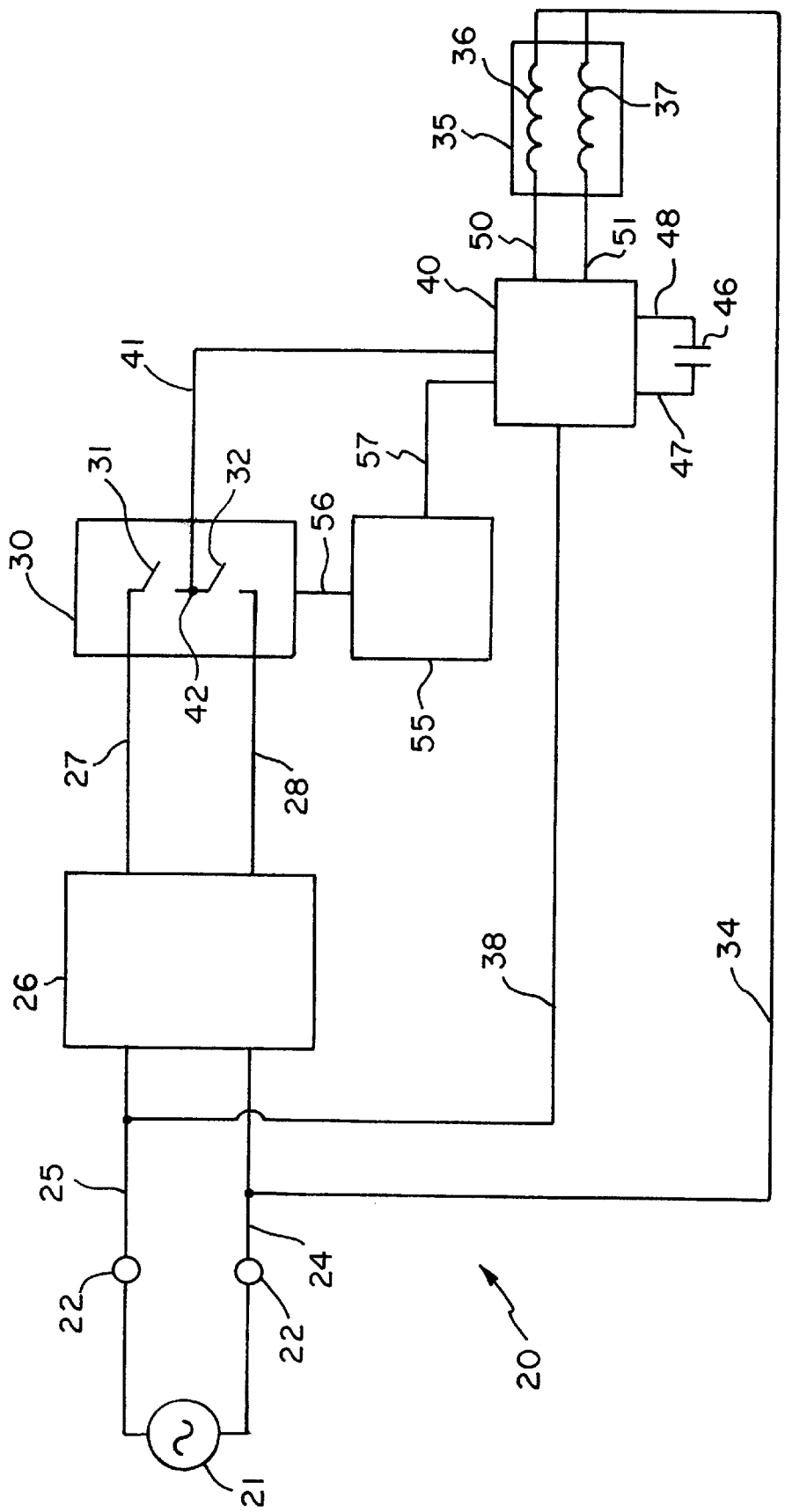
FIG. 1 is a block diagram of an adjustable speed drive for single-phase induction motors in accordance with the invention.

With reference to the drawings, an adjustable speed drive for single-phase induction motors is illustrated in block diagram form generally at 20 in FIG. 1. The drive 20 receives power from an AC power system 21 at input terminals 22. A first input line 24 and a second input line 25 are connected to a rectifier 26 which provides DC power on DC bus lines 27 and 28. The DC voltage on the lines 27 and 28 is provided to an inverter 30 which includes two controllable switches 31 and 32. A first output line 34 is connected to the first input line 24 and extends to a single-phase induction motor 35 where it is connected to a main winding 36 and an auxiliary winding 37 of the motor. A second output line 38 is connected to the second input line 25 and extends to a transfer switch circuit 40. A third output line 41 is connected to the node 42 between the switches 31 and 32 in the inverter 30 and is connected to the transfer switch circuit 40. A phase-shifting capacitor 46 is connected by lines 47 and 48 to the transfer switch circuit 40. A main winding supply line 50 extends from the transfer switch circuit 40 to the main winding 36 and an auxiliary winding supply line 51 extends from the transfer switch circuit to the auxiliary winding 37. A controller 55 is connected by lines 56 to the inverter 30 and by lines 57 to the transfer switch circuit 40 to control the operation of the inverter and the transfer switch circuit. In a first, full-speed drive mode of the adjustable speed drive 20, switches in the transfer switch circuit 40 are in a position directly connecting the second output line 38 to the main.winding.supply line 50 so that the main winding 36 of the motor is supplied directly with power from the input line 25 connected to the main AC power system 21. The third output line 41 from the inverter 30 is connected through the transfer switch circuit directly to the auxiliary winding supply line 51 to supply power to the auxiliary winding 37. The AC power system 21 typically provides power at 60 Hz in the United States (or 50 Hz in Europe and other areas), and the controller 55 operates the inverter 30 to provide output power on the line 41 at a frequency of 60 Hz, but controlled to be approximately 90° out of phase with the voltage from the power system 21 so that the power applied to the auxiliary winding 37 has the appropriate phase shift to develop start-up torque in the motor 35. When operation at a lower speed is desired, the operator provides a command to the controller 55 to switch the positions of the transfer switch circuit 40 such that the second input line 38 is disconnected from supplying power to the main winding 37, and the third output line 41 from the inverter is connected through the transfer switch circuit to the main winding supply line 50 to provide power directly to the main winding. The transfer switch circuit then also connects the third output line 41 through the phase-shifting capacitor 46 to the auxiliary winding supply line 51 so as to supply power from the inverter 30, phase-shifted by the capacitor 46, to the auxiliary winding 37. The capacitor 46 serves to provide a phase shift of approximately 90° to the power supplied to the auxiliary winding 37 as compared to the power supplied to the main winding 36 to allow start-up torque to be developed in the motor 35. The inverter 30 can be controlled by the controller 55 to produce a fundamental frequency which is typically less than the frequency of the power system 21, e.g., at 30 Hz. Depending on the slip due to the load imposed on the motor 35, the output speed of the motor with this lower input frequency will be at a speed lower than that of the motor when driven from line power at 60 Hz (e.g., about half-speed). If desired, the actual output speed of the motor can be monitored, and the frequency of the output voltage provided by the inverter 30 adjusted to achieve the desired operating speed.

Figure 2:
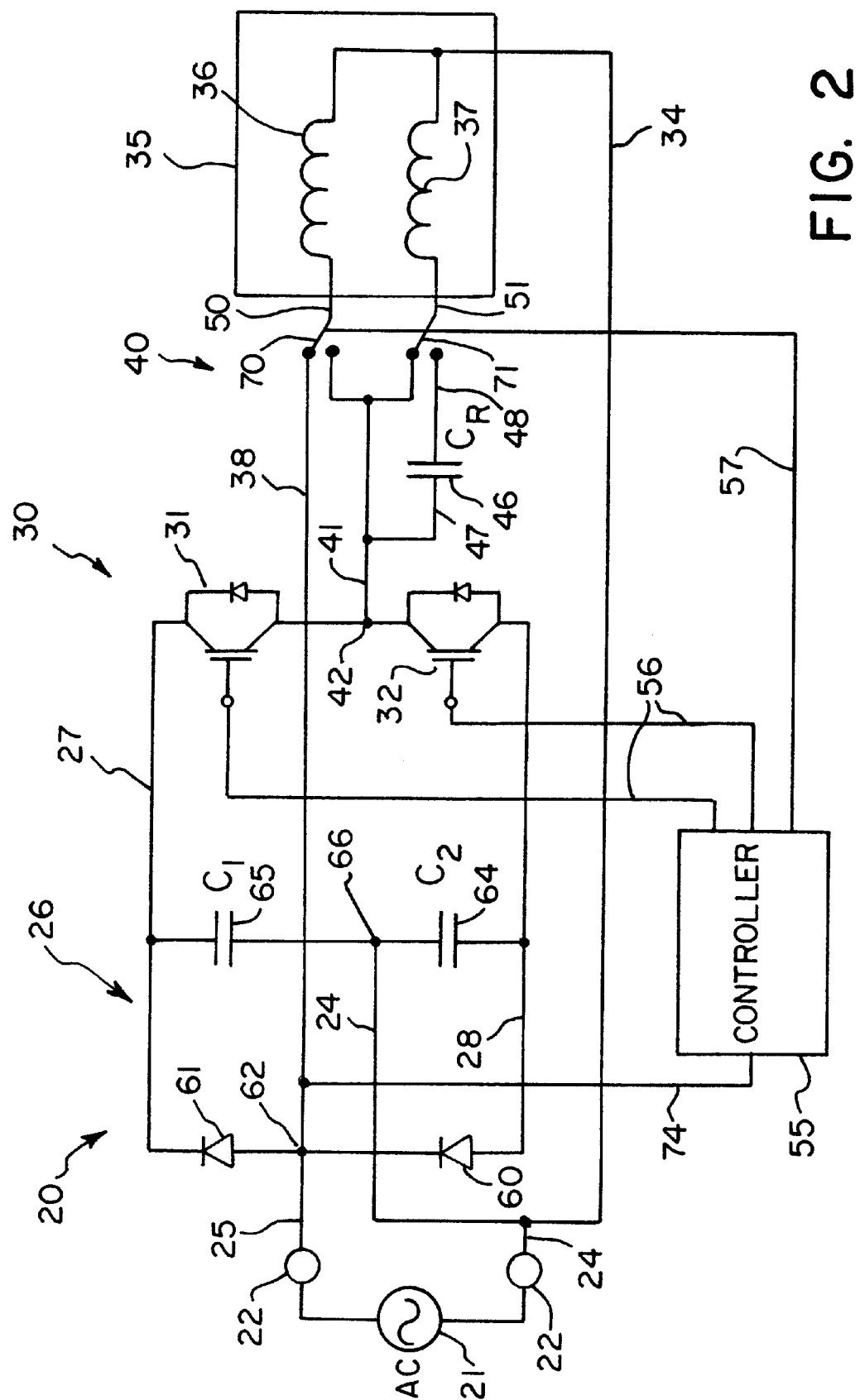
FIG. 2 is a schematic circuit diagram of an embodiment of an adjustable speed drive in accordance with the invention.

As shown in FIG. 2, the adjustable speed drive 20 may be implemented with a simple circuit structure having a minimum number of relatively inexpensive components. The rectifier 26 may be implemented with a pair of rectifying diodes 60 and 61, connected together at a node 62 to which the second input line 25 is connected, with the pair of diodes 60 and 61 connected across the DC bus lines 27 and 28. A pair of capacitors 64 and 65 are connected together at a node 66, which is connected to the first input line 24. The series connected capacitors 64 and 65 are also connected across the DC bus lines 27 and 28 to filter the voltage rectified by the diodes 60 and 61 to provide a substantially constant DC voltage across the bus lines 27 and 28. The inverter 30 may be implemented utilizing a pair of solid-state switching devices 31 and 32, such as the IGBTs shown in FIG. 2, which receive gate control signals at their gates from the control lines 56. Other types of power switching devices, such as MOSFETs, may also be utilized. The transfer switch circuit 40 may comprise a relay, as shown in FIG. 2, having two single throw switches 70 and 71 connected to switch together under the control of the signal on the control line 57 from the controller 55. Switches 70 and 71 are in a first position to operate the motor in the full-speed drive mode, and these switches are in a second position to operate the motor in the lower-speed mode. The first relay switch 70 is connected at an input side to the second output line 38 and the third output line 41, and is connected at its output side to the main winding supply line 50. The switch 70 switches between a first position connecting the second output line 38 to the supply line 50 and a second position connecting the third output line 41 to the main supply line 50 to provide power from the inverter 30 to the main motor winding. The relay switch 71 is connected at an input side (to receive power from the inverter) to the third output line 41 and to receive power from the inverter through the capacitor 46 as provided on the line 41, and is connected on its output side to the line 51 to provide output power to the auxiliary winding 37. The switch 71 switches from a first position connecting the line 41 directly to the supply line. 51 leading to the auxiliary winding to a second position connecting the power from the inverter 30 through the capacitor 46 by connecting the line 48 to the auxiliary winding supply line 51. The switches 70 and 71 in the transfer switch circuit.40 may also be implemented in other manners, e.g., by bilateral semiconductor switches, e.g., triacs or paralleled thyristors, or any other device which provides appropriate switching of power. The controller 55 has a sense line 74 which is connected to the second input line 25 to receive the voltage on it from the AC power system. The controller monitors the AC power line voltage to control the timing of switching of the switches 31 and 32 in the inverter 30, e.g., at 60 Hz with an appropriate phase shift when supplying power in the first mode to the auxiliary winding 37, and at a selected lower frequency (e.g., 30 Hz or half the power line frequency) when supplying power directly from the inverter 30 to the main winding 36 and through the capacitor 46 to the auxiliary winding 37. Because the inverter 30 supplies only the auxiliary winding 37 during full-speed operation and both windings 36 and 37 in lower frequency half-speed operation, the adjustable speed drive of the invention can be smaller than conventional drives and have significantly lower manufacturing costs. In addition, if desired, the transfer switch circuit 40 can be formed to allow operation in a default or failure mode bypassing the drive 20 entirely so that power is supplied directly from the power system 21 to the main winding 36 and through the capacitor 46 to the auxiliary winding 37.

Figure 3:
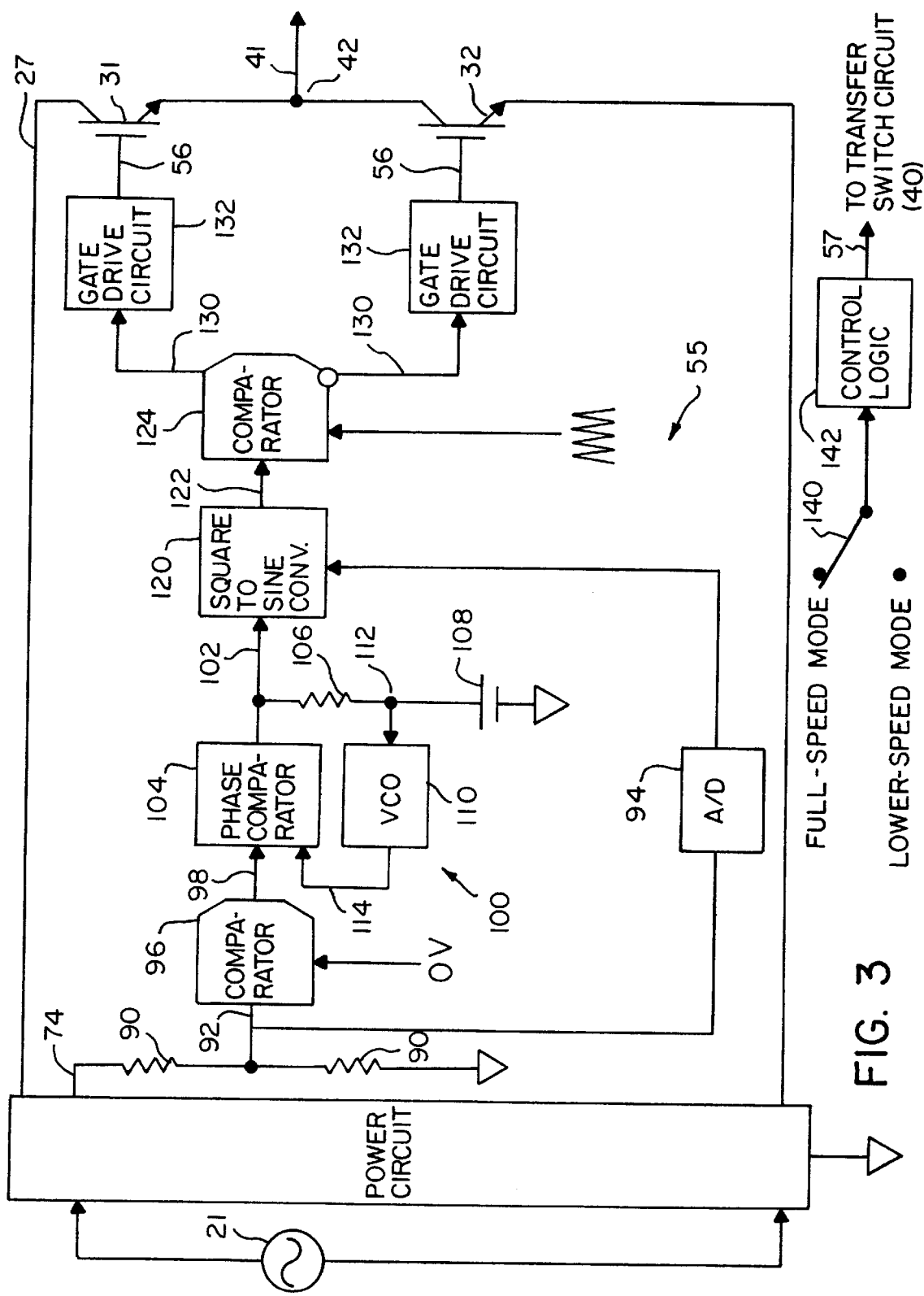
FIG. 3 is a block diagram of an embodiment of the controller for an adjustable speed drive in accordance with the invention.

As shown in an exemplary embodiment in FIG. 3, the controller 55 has circuitry to generate signals on control lines 56 and 57. For inverter 30 to produce on output line 41 a sinusoidal voltage which is shifted by 90° from the voltage on the power system 21, the circuitry in controller 55 must generate the proper command signals on control lines 56, which together control the states of inverter switches 31 and 32. The sense line 74 conducts sinusoidal voltage from the AC power system 21 to a resistive voltage divider 90 which scales the voltage to a level on the voltage divider output line 92 that is appropriate for signal processing. An analog-to-digital converter (A/D) 94 records and stores the most recent approximately 90° of the sinusoidal waveform of this voltage divider output line 92 for determination of waveform characteristics, e.g. voltage amplitude on the AC power system 21. The voltage divider output line 92 also feeds a comparator 96 that converts the sinusoidal signal to a logic level square wave on comparator output line 98. This comparator output line 98 is an input to a phase-locked loop (PLL) 100 which produces on its output line 102 a square wave delayed with respect to the PLL input by 90°. One low cost embodiment of such a PLL uses an IC such as Harris part number CD4046A. As depicted in FIG. 3, the key elements of the PLL are the phase comparator 104, a low-pass loop filter formed by series combination of a resistor 106 and a capacitor 108, and a voltage-controlled oscillator (VCO) 110. The phase comparator output drives the PLL output line 102. This output line feeds the low-pass filter to produce an average value of the PLL output waveform on the VCO input line 112. The VCO 110 produces a square wave on VCO output line 114 that is fed into the second input of the phase comparator 104 in such a manner as to cause the PLL output line 102 to exhibit the same frequency as the square wave on comparator output line 98 but shifted from it in phase by 90°. The phase-shifted square wave on PLL output line 102 provides timing and frequency information to a square-to-sine converter 120. Using this information in conjunction with the approximately 90° of stored waveform sampled data from ADC 94, the square-to-sine converter 120 generates on signal line 122 a sinusoidal signal that is delayed by 90° from the sinusoidal signal on sense line 74 and the AC power system 21. This phase-shifted sinusoid on signal line 122 is compared to a triangle wave in a comparator 124 to produce sinusoidal PWM switching commands for switches 31 and 32. The triangle wave typically has much higher frequency than the desired fundamental frequency of the inverter output in order to, among other things, minimize ripple currents in the inductive load. The comparator 124 typically has complementary outputs 130 to control gate drive circuits 132 such that both switches 31 and 32 will not be in the on-state at the same time. To switch between the full-speed mode and the lower-speed mode, the circuitry in controller 55 must generate the signal on control line 57 that commands the corresponding state of transfer switch circuit 40. The operator provides a command, using a switch 140, or any equivalent means of controlling the logical state of the operating mode, to toggle as desired between full-speed mode and lower-speed mode. Any suitable control logic 142 can monitor the state of the switch 140 and generate the appropriate control signal on line 57.

Figure 4:
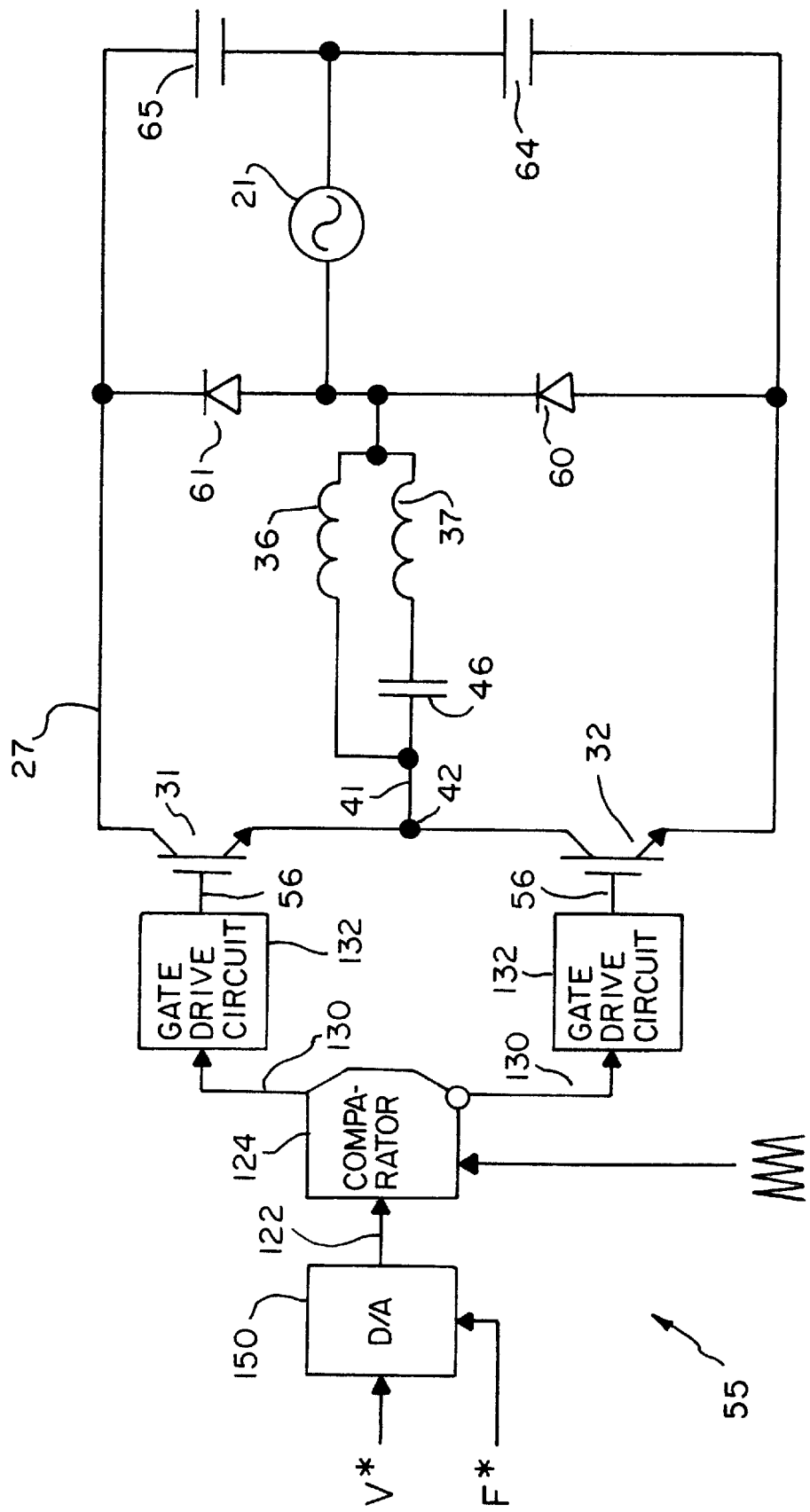
FIG. 4 is a block diagram of an embodiment of the controller adapted for constant volts/hertz operation in accordance with the invention.

As shown in FIG. 4, the controller 55 of the invention can be adapted to command a constant ratio between the inverter fundamental voltage on output line 41 and the fundamental frequency (volts/hertz), e.g., half voltage at half frequency when the switches 70 and 71 of FIG. 2 are in the lower position. Such operation is known to optimize drive performance by, for example, avoiding saturation at reduced excitation frequency. In the preferred embodiment, with both a full-speed mode and a lower-speed mode, this constant volts/hertz operation would primarily benefit the lower-speed mode in which motor excitation frequency can be either fixed or variable. With reference to FIG. 4, F* represents a desired excitation frequency command signal, and V* represents a voltage command signal appropriately scaled to conform to the desired ratio of volts/hertz. In the exemplary implementation, a digital-to-analog converter (D/A) 150 generates a sinusoidal voltage signal on line 122 having an amplitude that is directly proportional to the excitation frequency, F*. Comparator 124 then compares this sinusoidal waveform to a triangle wave to produce sinusoidal PWM switching commands for switches 31 and 32 in the same manner as previously described.

The drive of the present invention may control a motor to operate at multiple discrete speeds or at continuously variable speeds. The drive may also be used to control the auxiliary winding flux level in the full speed mode, e.g., by applying excitation voltage to provide 20% of rated flux for the winding to produce less torque ripple or to provide 100% of the rated flux to maximize torque without incurring significant saturation of machine flux paths.

The following illustrates an example of the adjustable speed drive of the invention as analyzed by computer simulation. In this simulation, the parameters of a practical ¾ horsepower (HP) machine were used assuming a supply voltage of 220 Vrms at the input of the drive. A steady-state mathematical model was used in the computer modeling to determine the operating points of the machine under various working conditions and to calculate the optimal parameters and settings of the drive.

Figure 5:
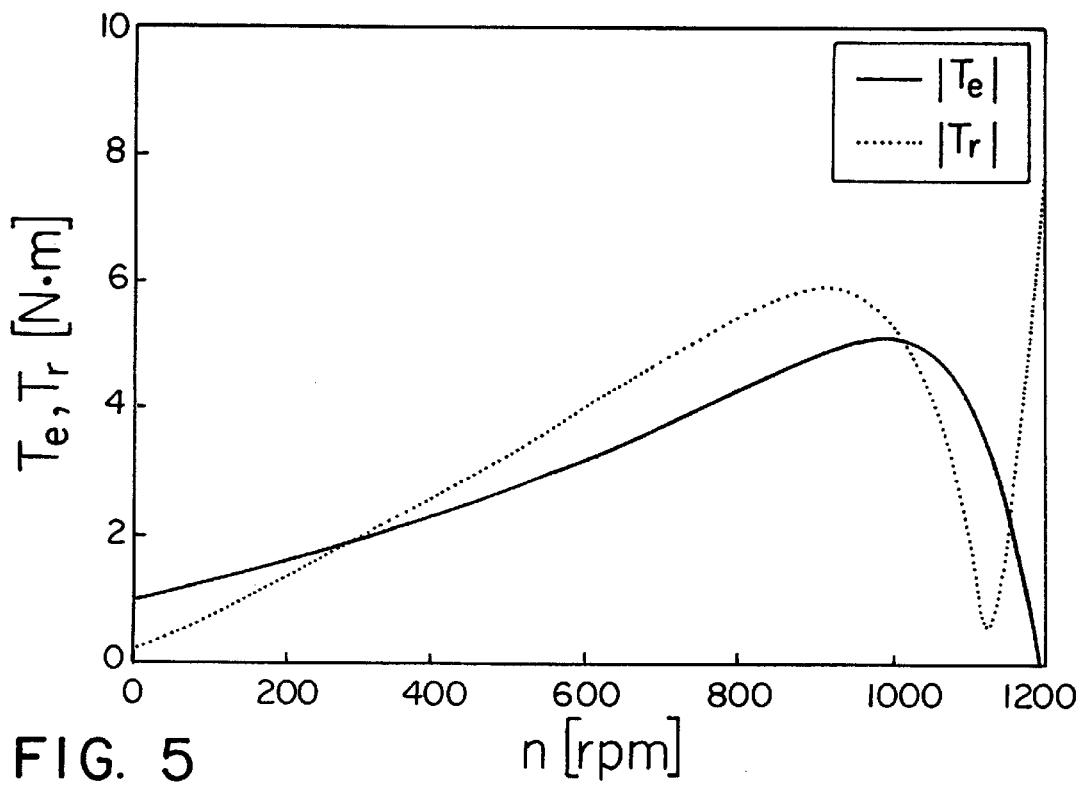
FIG. 5 are graphs showing motor torque-speed characteristics in the main and auxiliary windings of a single phase induction motor driven at full-speed frequency of 60 Hz using standard operation from the AC power mains with a phase-shift capacitor in series with the auxiliary winding.
Figure 6:
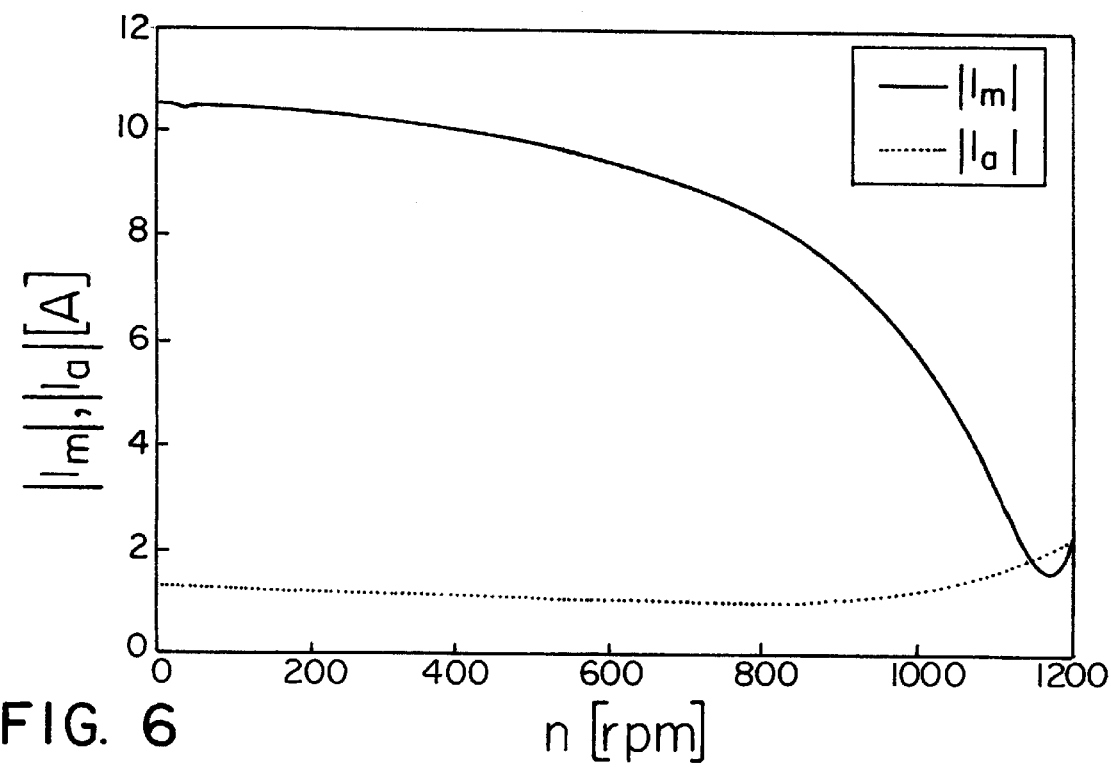
FIG. 6 are graphs showing stator currents as a function of speed in the main and auxiliary windings of a single phase induction motor driven at full-speed frequency of 60 Hz using standard operation from the AC power mains with a phase-shift capacitor in series with the auxiliary winding.

First, standard operation of the machine with a run capacitor of 10 µF, for which the motor was originally designed, was simulated to obtain a reference for the assessment of the quality of the drive. FIG. 5 shows the torque-speed characteristics. The solid line denoted $T_e$ represents the resulting electromagnetic torque of the machine and the dotted line denoted $T_r$ shows the amplitude of the torque pulsations. FIG. 6 shows the dependencies of the current magnitudes in the main ($I_m$) and the auxiliary ($I_a$) windings.

Figure 7:
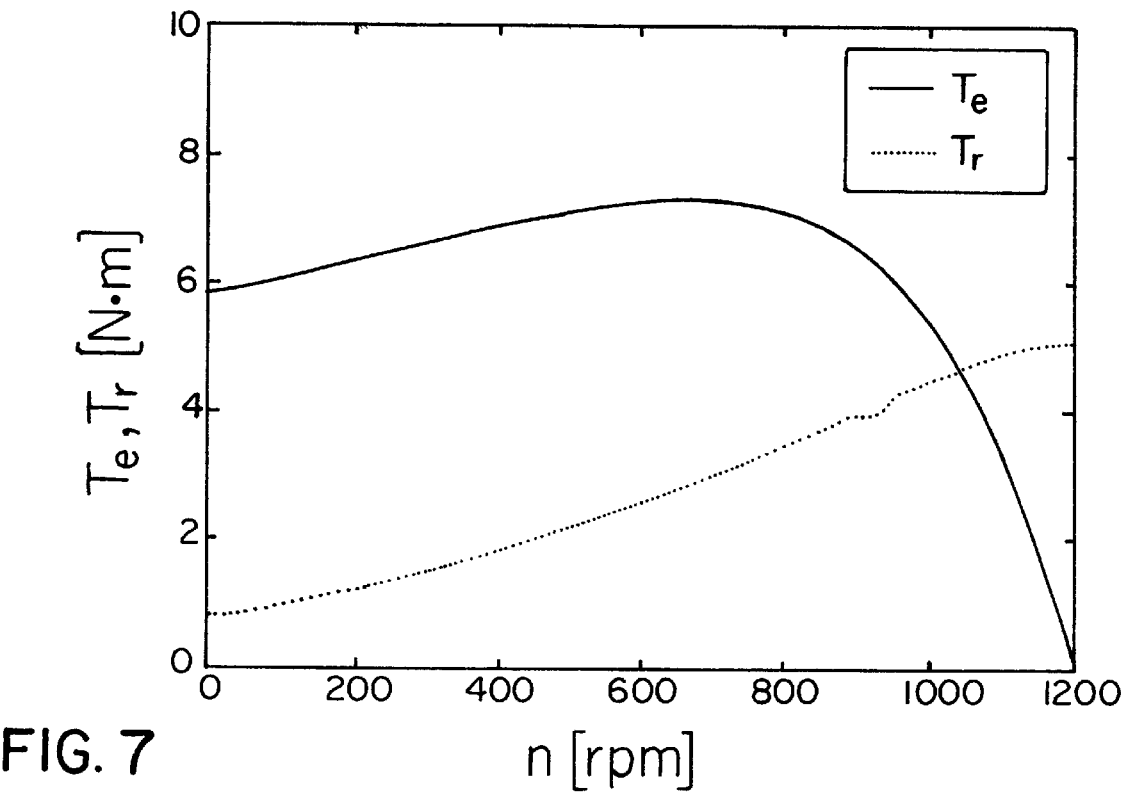
FIG. 7 are graphs showing motor torque-speed characteristics in the main and auxiliary windings of a single phase induction motor driven at full-speed frequency of 60 Hz using the adjustable speed drive in accordance with the invention.

Second, full-speed operation was investigated. The inverter supplying the auxiliary winding was controlled to generate a voltage of the same amplitude but shifted by 86° from the phase of the voltage from the AC mains to achieve phase quadrature of the currents. FIG. 7 shows the torque-speed characteristics of the drive. It can be noted that the machine has quite high starting torque when fed in this manner. The relatively high value of the torque ripple is mainly due to the limitation of the voltage amplitude generated by the inverter. Balanced operation would require the magnitude of the voltage for the auxiliary winding to be approximately 30% above the magnitude of the voltage supplying the main winding for this particular machine. This is, however, not achievable with a simple suboscillation pulse-width-modulation (PWM) method as utilized in the simulation.

Figure 8:
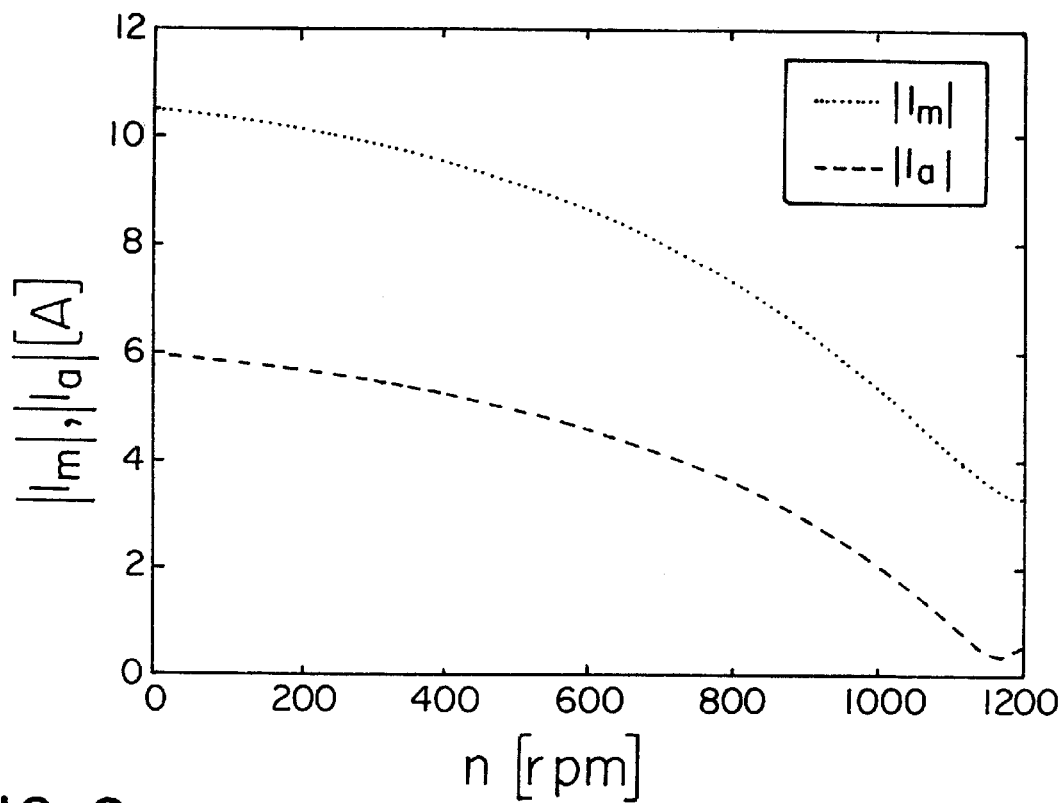
FIG. 8 are graphs showing stator currents as a function of speed in the main and auxiliary windings of a single phase induction motor driven at full-speed frequency of 60 Hz using the adjustable speed drive in accordance with the invention.

The dependencies of the magnitudes of currents in the main ($I_m$) and auxiliary ($I_a$) windings on the mechanical speed are presented in FIG. 8. It can be seen that the current in the auxiliary winding is significantly lower than that in the main winding over the range of operating speed considered (with a slip of 6–8%), confirming that relatively low rated inverter switching devices may be used.

Comparison of FIGS. 7 and 8 with FIGS. 5 and 6 reveals that the drive provides in the full-speed mode significantly higher starting as well as breakdown torques than the permanent split capacitor motor. On the other hand the produced torque ripple is higher for the drive. The stator currents are comparable in both cases for the nominal operating speed.

Figure 9:
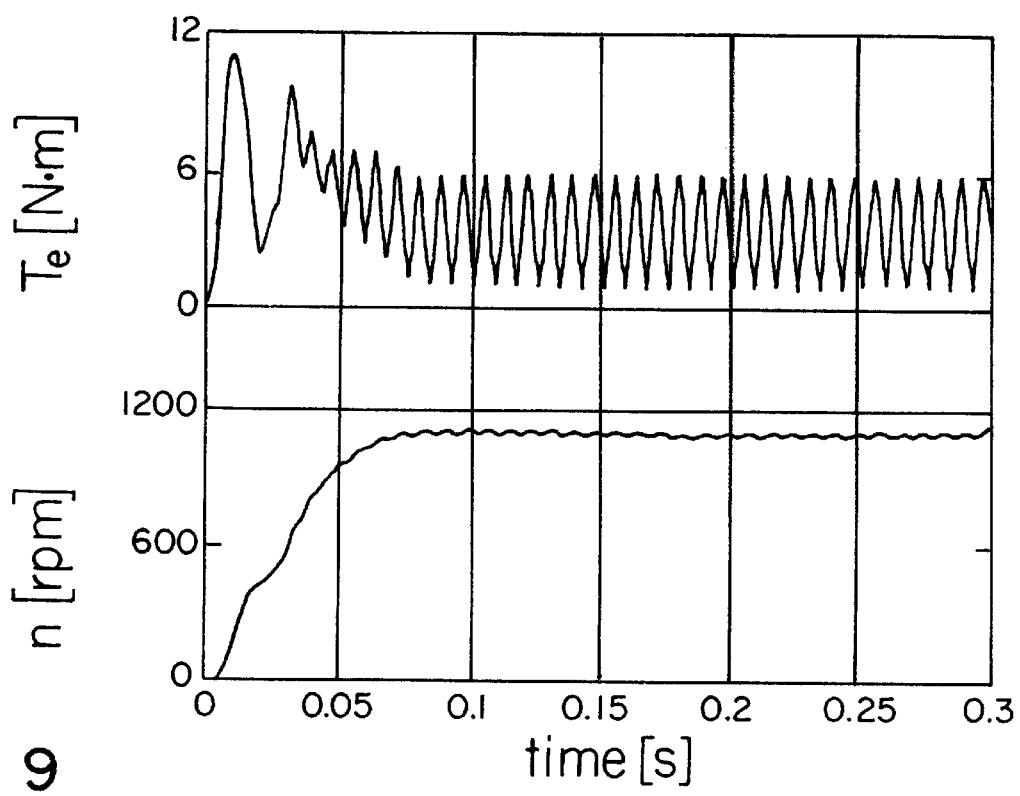
FIG. 9 are graphs showing motor torque and speed at start-up for full-speed mode operation utilizing the adjustable speed drive in accordance with the invention.
Figure 10:
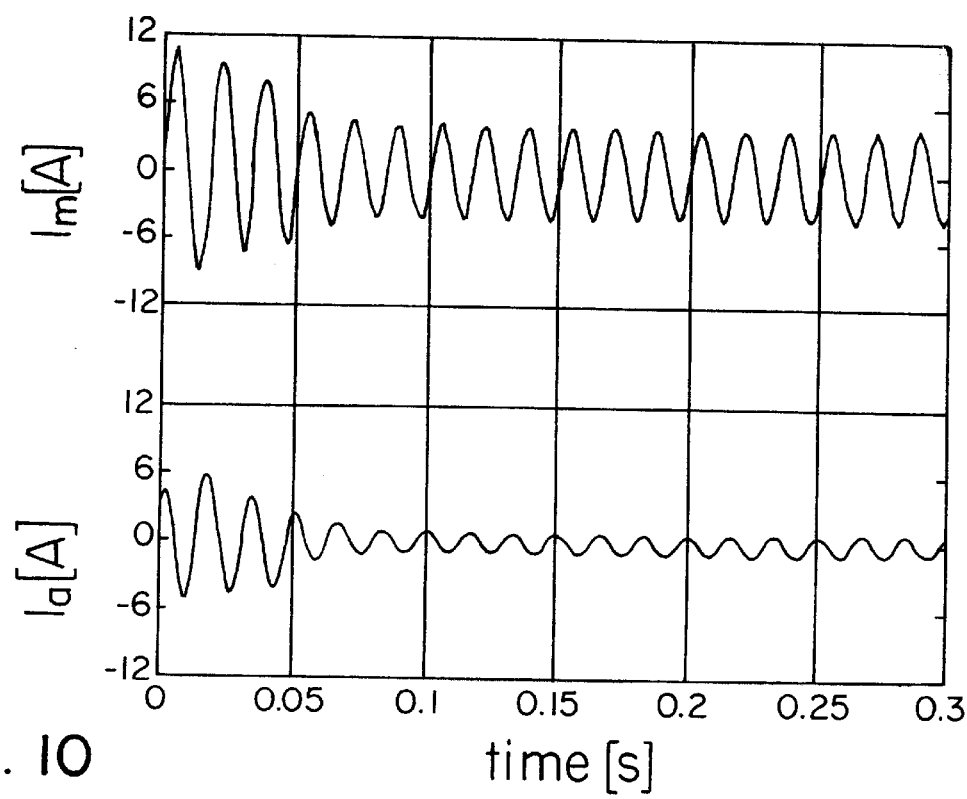
FIG. 10 are graphs showing main and auxiliary winding stator currents at start-up for full-speed operation of a motor utilizing the adjustable speed drive in accordance with the invention.

Results of the numerical simulation of the start of the machine at full frequency (60 Hz) are illustrated in FIGS. 9 and 10. A fan load characteristic was used in the simulation. FIG. 9 shows the resulting electromagnetic torque ($T_e$) and the mechanical speed (n) of the machine. The results confirm a higher content of torque pulsations in steady-state operation with the full load. This effect is, however, filtered to a great extent by the moment of inertia of the machine and the attached fan and has only a small effect on the mechanical speed. The waveforms of currents in the main. ($I_m$) and auxiliary ($I_a$) windings are shown in FIG. 10.

Figure 11:
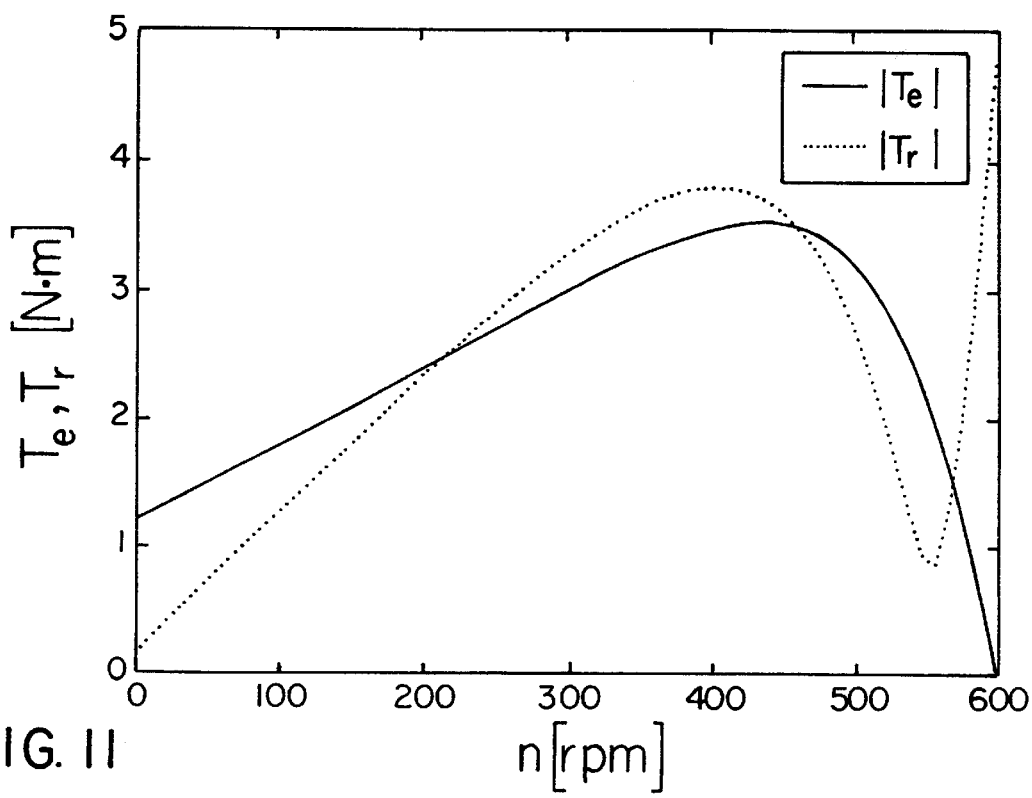
FIG. 11 are graphs showing torque versus speed characteristics of a motor driven at a half-speed frequency of 30 Hz utilizing the adjustable speed drive in accordance with the invention.
Figure 12:
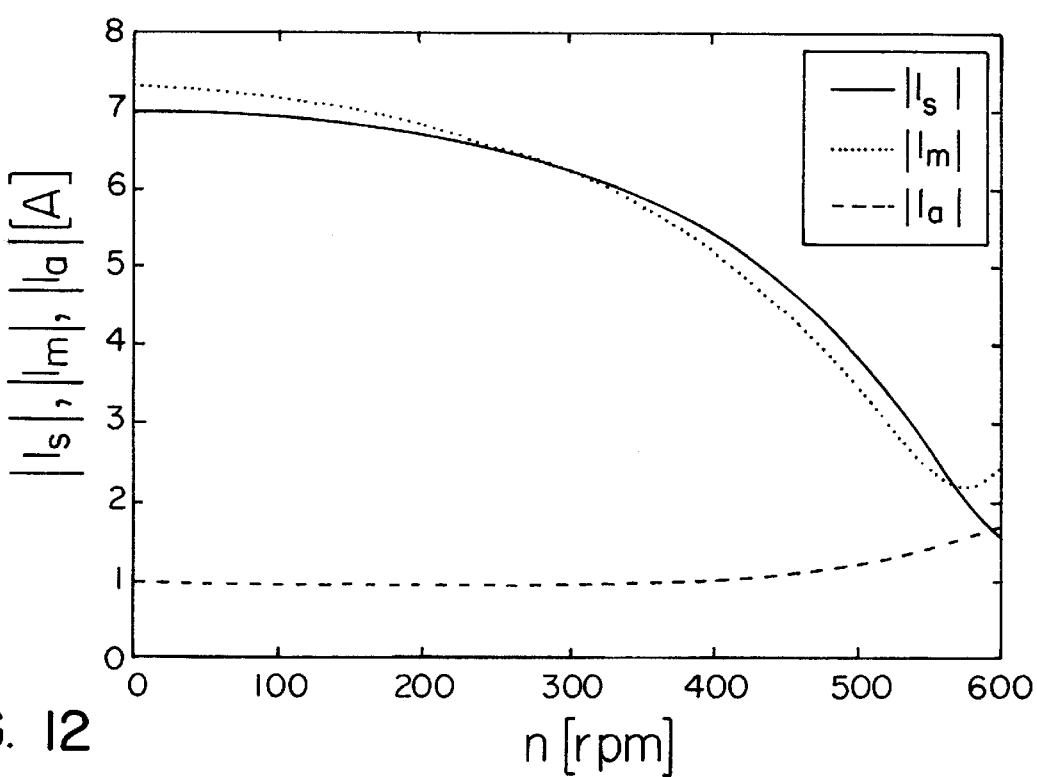
FIG. 12 are graphs showing main and auxiliary winding stator currents as a function of speed for a motor driven at a half-speed frequency of 30 Hz utilizing the adjustable speed drive in accordance with the invention.
Figure 13:
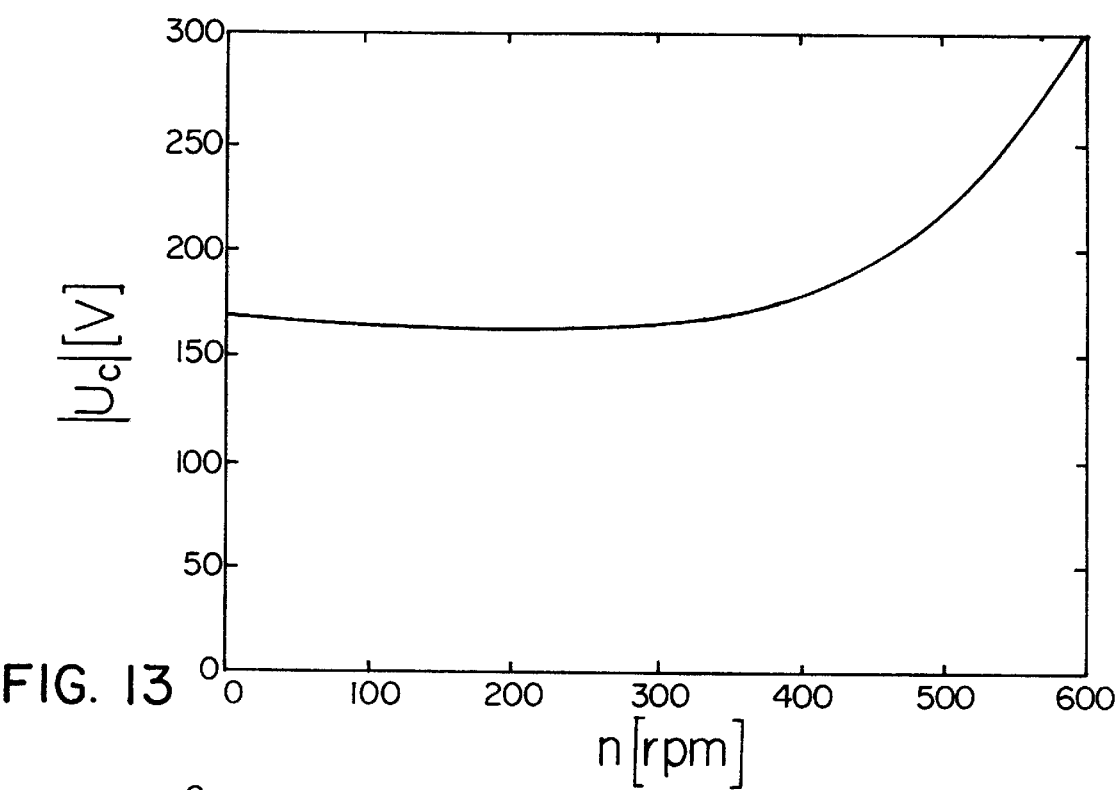
FIG. 13 is a graph illustrating the voltage across the AC phase-shifting capacitor for a motor driven at a half-speed frequency of 30 Hz utilizing the adjustable speed drive in accordance with the invention.

Third, operation at a reduced speed was analyzed. The inverter produced a voltage waveform with an amplitude of 110 $V_{rms}$ and a frequency of 30 Hz. A phase-shift capacitor of 30 $\mu F$ was connected in series with the auxiliary winding. The torque-speed characteristic and the dependence of the torque ripple on the speed are shown in FIG. 11. The value of the torque pulsations ($T_r$) now has a local minimum near the expected operating point. FIG. 12 shows the currents in the main ($I_m$) and auxiliary windings ($I_a$) together with the overall current ($I_s$) drawn from the inverter. It can be noted that the amplitude of the current supplied by the inverter is comparable in both cases. The magnitude of the AC voltage across the phase-shifting capacitor plotted against the speed is shown in FIG. 13.

Figure 14:
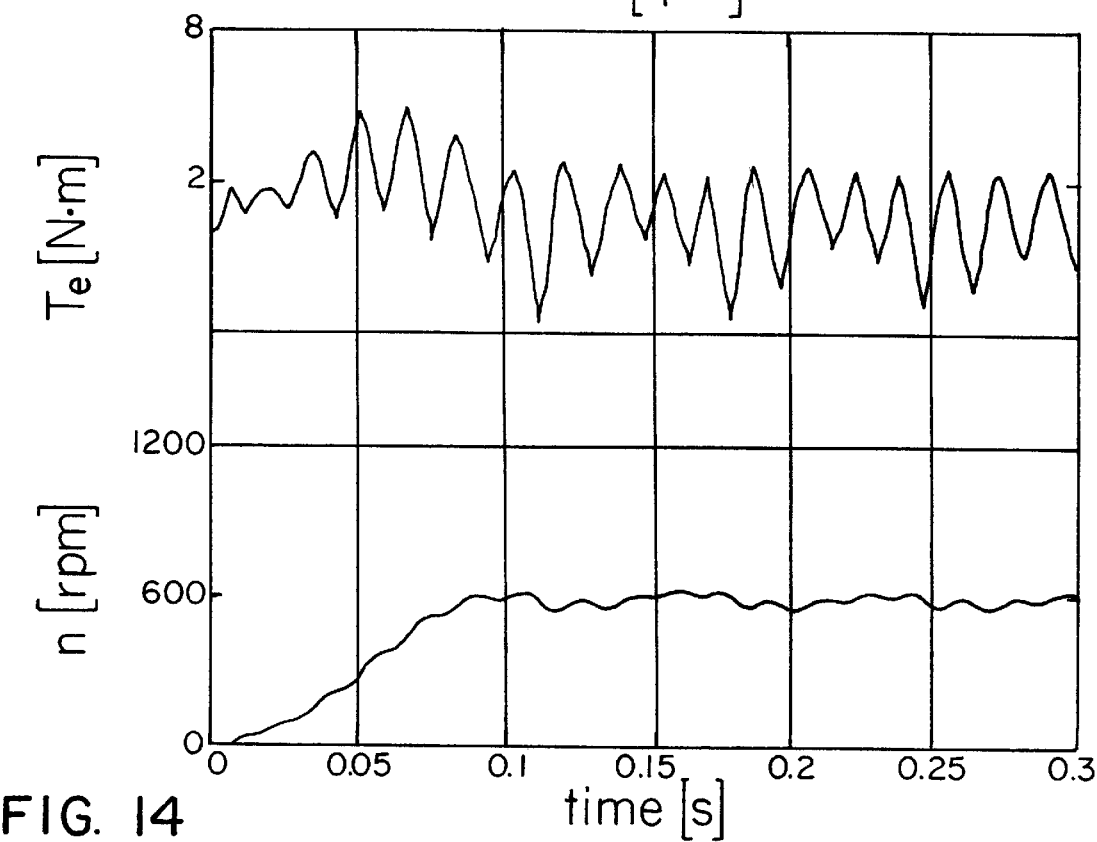
FIG. 14 are graphs illustrating torque and speed at start-up for a motor driven at a half-speed frequency of 30 Hz utilizing the adjustable speed drive in accordance with the invention.
Figure 15:
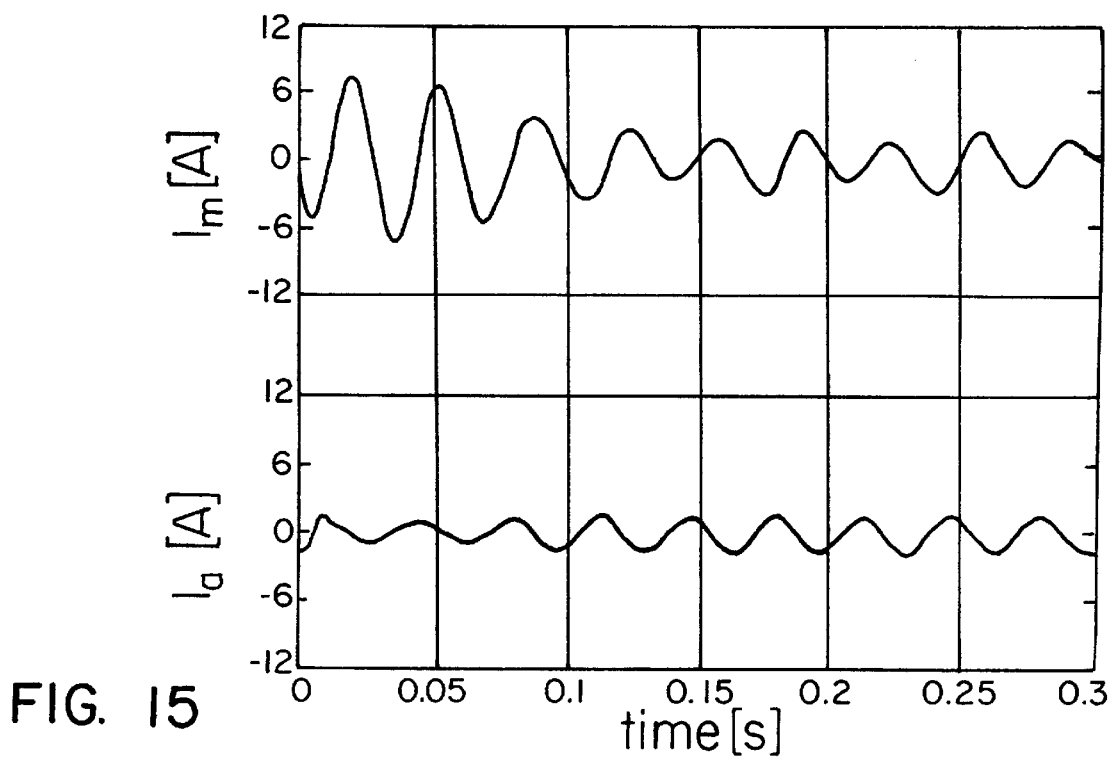
FIG. 15 are graphs illustrating main and auxiliary winding currents at start-up of a motor driven at a half-speed frequency of 30 Hz utilizing the adjustable speed drive in accordance with the invention.
Figure 16:
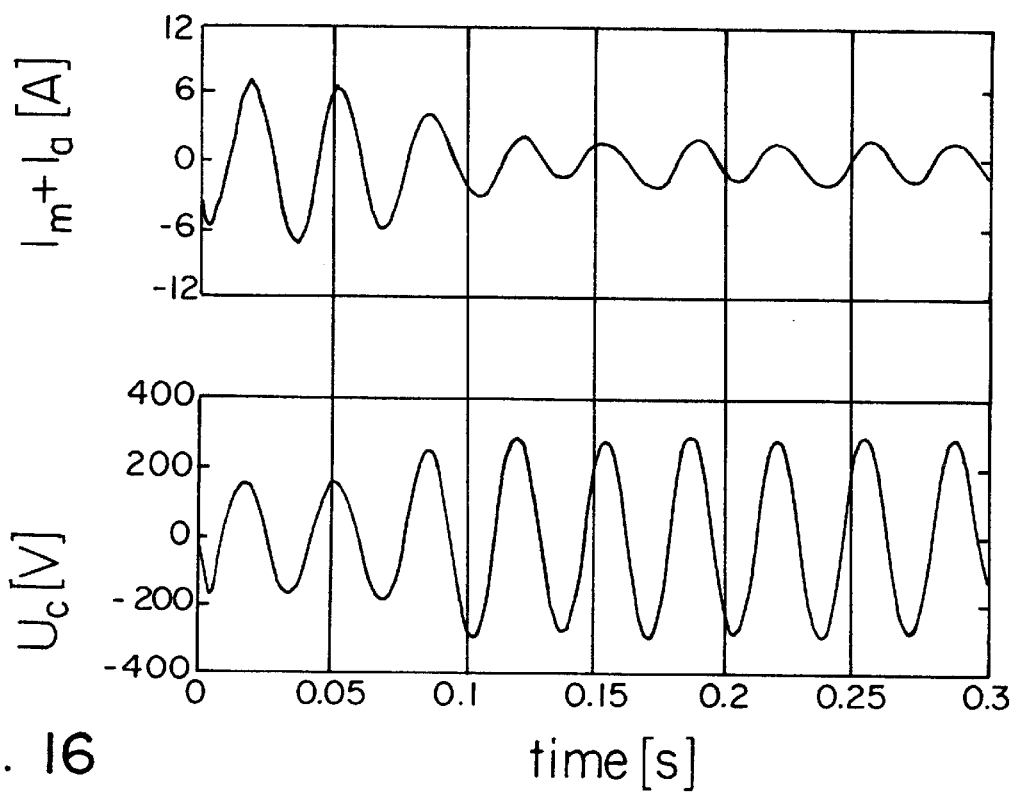
FIG. 16 are graphs illustrating the current through and voltage across the AC phase-shifting capacitor at start-up for a motor driven at a half-speed frequency of 30 Hz utilizing the adjustable speed drive in accordance with the invention.

The results of a simulated start of the machine are given in FIGS. 14–16. FIG. 14 (torque $T_e$ and speed n) and FIG. 15 (stator currents $I_m$ and $I_a$) represent the quantities corresponding to those in FIGS. 9 and 10 for the full-speed operation. FIG. 16 shows the resulting current ($I_m$ and $I_a$) supplied by the inverter and the voltage ($V_c$) across the phase-shifting capacitor.

Transitions between full-speed mode, lower-speed mode, and other modes can be accomplished during operation of the motor 35. For example, after the motor is started by using the inverter 30 to drive the auxiliary winding 37, the invention can, for example, be adapted to stop inverter 30 from switching. In this way, the invention can provide enhanced starting torque compared to standard capacitor-start motors and can disengage under electronic control rather than through use of, for example, a centrifugal switch.

Compared to simple voltage reduction at a fixed excitation frequency, an adjustable speed drive in accordance with the invention can efficiently control motor rotational velocity. Therefore, the invention can be incorporated into applications requiring motor velocity regulation.

The control algorithm for the controller 55 may be implemented in a universal control board based on a digital signal processor (e.g., TMS320F240 from Texas Instruments). The board may be connected to a PC computer through the RS232 interface, which enables changes of control parameters in real time. The control algorithm may generate a PWM voltage waveform with variable amplitude and frequency with the ability to synchronize the output with the line voltage and to adjust the phase shift between the line and the generated waveform. Alternatively, the circuitry of the controller 55 may be substantially integrated as, for example, in an application-specific integrated circuit (ASIC).

It is understood that the invention is not confined to the particular embodiments set forth herein as illustrative, but embraces all such forms thereof as come within the scope of the following claims.

What is claimed is:

1. An adjustable speed drive for single-phase induction motors having a main winding and an auxiliary winding comprising:
    (a) first and second input lines connectable to single-phase AC power lines;
    (b) a pair of DC bus lines;
    (c) a rectifier connected to the first and second input lines and to the DC bus lines: such that, AC voltage applied to the input lines is rectified to a DC voltage applied on the DC bus lines;
    (d) an inverter comprised of two gate controlled switching devices connected together across the DC bus lines;
    (e) a first output line connected to the first input line, a second output line connected to the second input line and a third output line connected to a node between the two gate controlled switching devices; and
    (f) a transfer switch circuit connected to the second and third output lines, and connected to a main winding supply line and an auxiliary winding supply line that may be connected to the main winding and auxiliary winding, respectively, of an induction motor, wherein the first output line may be connected to both the main winding and the auxiliary winding to complete the circuit therethrough, and a phase-shifting capacitor connected to the transfer switch circuit, the transfer switch circuit having switches switchable between a first position in which the second output line is connected directly to the main winding supply line and the third output line is connected to the auxiliary winding supply line and a second position in which the third output line is connected directly through the transfer switch circuit to the main winding supply line and is also connected by the transfer switch circuit through the phase-shifting capacitor to the auxiliary winding supply line.

2. The adjustable speed drive of claim 1 further including a controller for the inverter connected to switch the inverter switching devices to provide output power at a frequency corresponding to the input frequency from the AC supply lines and at a phase shift of about 90° with respect to the AC power line power when the transfer switch circuit is in its first position.

3. The adjustable speed drive of claim 2 wherein the controller controls the inverter to provide a voltage to the auxiliary winding supply line that will produce rated flux in the auxiliary winding of a selected motor.

4. The adjustable speed drive of claim 2 wherein the controller controls the inverter to switch the switching devices to provide output power at a frequency lower than the AC input line frequency when the transfer switch circuit is in its second position.

5. The adjustable speed drive of claim 4 wherein the controller controls the amplitude of the inverter voltage to vary in direct proportion to the variation in frequency of the inverter output power from the AC input line frequency.

6. The adjustable speed drive of claim 4 wherein the controller controls the inverter switching devices to switch to provide output power at about 30 Hz when the transfer switch circuit is in its second position.

7. The adjustable speed drive of claim 1 wherein the gate controlled switching devices are selected from the group consisting of IGBTs and MOSFETs.

8. The adjustable speed drive of claim 1 wherein the transfer switch circuit comprises a relay having two single throw switches switching together, a first of the switches connected to the second output line and the third output line on one side of the switch and to the main winding supply line on another side of the switch, a second of the switches connected to the third output line and connected to the third output line through the phase-shifting capacitor on one side of the switch and to the auxiliary winding supply line on another side of the switch.

9. The adjustable speed drive of claim 1 wherein the rectifier comprises a pair of capacitors connected across the DC bus lines with a node between the capacitors connected to the first of the input lines, and a pair of rectifying diodes connected together across the DC bus lines with a node between the diodes connected to the second of the input lines.

10. An adjustable speed drive for single-phase induction motors having a main winding and.an auxiliary winding comprising:
(a) first and second input lines connectable to single-phase AC power lines;
(b) a pair of DC bus lines;
(c) a pair of capacitors connected across the DC bus lines with a node between the capacitors connected to the first of the input lines;
(d) a pair of rectifying diodes connected together across the DC bus lines, a node between the diodes connected to the second of the input lines such that AC voltage applied to the input lines is rectified by the diodes and applied on the DC bus lines to the capacitors;
(e) an inverter comprised of two gate controlled switching devices connected together across the DC bus lines;
(f) a first output line connected to the first input line, a second output line connected to the second input line and a third output line connected to a node between the two gate controlled switching devices; and
(g) a transfer switching relay having two single throw switches that switch together, a first of the switches connected to the second output line and the third output line on one side of the switch and to the main winding supply line on another side of the switch, a second of the switches connected to the third output line and connected to the third output line through a phase-shifting capacitor on one side of the switch and to the auxiliary winding supply line on another side of the switch, wherein the first output line may be connected to both the main winding and the auxiliary winding to complete the circuit therethrough, the transfer switch relay switchable between a first position in which the second output line is connected by the first switch directly to the main winding supply line and the third output line is connected by the second switch to the auxiliary winding supply line and a second position in which the third output line is connected by the first switch directly to the main winding supply line and is also connected by the second switch through the phase-shifting capacitor to the auxiliary winding supply line.

11. The adjustable speed drive of claim 10 further including a controller for the inverter connected to switch the inverter switching devices to provide output power at a frequency corresponding to the input frequency from the AC supply lines and at a phase shift of about 90° with respect to the AC power line power when the transfer switch relay is in its first position.

12. The adjustable speed drive of claim 11 wherein the controller controls the inverter to provide a voltage to the auxiliary winding supply line that will produce rated flux in the auxiliary winding of a selected motor.

13. The adjustable speed drive of claim 11 wherein the controller controls the inverter to switch the switching devices to provide output power at a frequency lower than the AC input line frequency when the transfer switch relay is in its second position.

14. The adjustable speed drive of claim 12 wherein the controller controls the amplitude of the inverter voltage to vary in direction proportion to the variation in frequency of the inverter output power from the AC input line frequency.

15. The adjustable speed drive of claim 12 wherein the controller controls the inverter switching devices to switch to provide output power at about 30 Hz when the transfer switch circuit is in its second position.

16. The adjustable speed drive of claim 11 wherein the gate controlled switches are selected from the group consisting of IGBTs and MOSFETs.

17. The adjustable speed drive of claim 10 wherein the controller activates transitions of the relay in response to desired operation to achieve either full-speed mode in the first position or lower-speed mode in the second position.

18. An adjustable speed drive for single-phase induction motors having a main winding and an auxiliary winding comprising:
(a) first and second input lines connectable to single-phase AC power lines;
(b) a pair of DC bus lines;
(c) a rectifier connected to the first and second input lines and to the DC bus lines such that AC voltage applied to the input lines is rectified to a DC voltage applied on the DC bus lines;
(d) an inverter comprised of two gate controlled switching devices connected together across the DC bus lines;
(e) a first output line connected to the first input line, a second output line connected to the second input line and a third output line connected to a node between the two gate controlled switching devices; and
(f) a transfer switch connected to the second and third output lines, and connected to a main winding supply line that may be connected to the main winding of an induction motor, wherein the first output line may be connected to both the main winding and the auxiliary winding to complete the circuit therethrough, and a phase-shifting capacitor connected between the third output line and the auxiliary winding supply line, the transfer switch switchable between a first position in which the second output line is connected to the main winding supply line and a second position in which the third output line is connected to the main winding supply line.

19. The adjustable speed drive of claim 18 further including a controller for the inverter connected to switch the inverter switching devices to provide output power at a frequency corresponding to the input frequency from the AC supply lines and at a phase shift of about 90° with respect to the AC power line power when the transfer switch circuit is in its first position.

20. The adjustable speed drive of claim 19 wherein the controller controls the inverter to switch the switching devices to provide output power at a frequency lower than the AC input line frequency when the transfer switch circuit is in its second position.

* * * * *

UNITED STATES PATENT AND TRADEMARK OFFICE
CERTIFICATE OF CORRECTION

PATENT NO. : 6,570,778 B2
DATED : May 27, 2003
INVENTOR(S) : Lipo et al.

It is certified that error appears in the above-identified patent and that said Letters Patent is hereby corrected as shown below:

Column 11,
Line 2, please remove the period between the words "and.an" to read -- and an --.

Signed and Sealed this

Twenty-third Day of September, 2003

JAMES E. ROGAN
*Director of the United States Patent and Trademark Office*